United States Patent [19]

Ishiwata et al.

[11] Patent Number: 5,853,878
[45] Date of Patent: Dec. 29, 1998

[54] ELASTIC FIBER, PROCESS FOR THE SAME AND POLYESTER ELASTOMER USED THEREOF

[75] Inventors: Toyoaki Ishiwata; Jiro Sadanobu, both of Iwakuni, Japan

[73] Assignee: Teijin Limited, Osaka, Japan

[21] Appl. No.: 704,539

[22] PCT Filed: Mar. 21, 1996

[86] PCT No.: PCT/JP96/00729

§ 371 Date: Sep. 12, 1996

§ 102(e) Date: Sep. 12, 1996

[87] PCT Pub. No.: WO96/30427

PCT Pub. Date: Oct. 3, 1996

[30] Foreign Application Priority Data

Mar. 24, 1995 [JP] Japan ..................................... 7-066086
Mar. 27, 1995 [JP] Japan ..................................... 7-067519

[51] Int. Cl.[6] ............................. D07G 3/00; C08F 20/00; C08G 63/00; C08G 63/02
[52] U.S. Cl. ........................... 428/364; 428/395; 525/437; 528/176; 528/193; 528/271
[58] Field of Search ..................................... 428/364, 395; 528/176, 193, 271, 272; 525/437

[56] References Cited

U.S. PATENT DOCUMENTS 3,865,869  2/1975  Kuehn et al. .
3,993,629  11/1976  Hasunuma et al. .

FOREIGN PATENT DOCUMENTS

| 4320313 | 8/1943 | Japan . |
| 47-14054 | 4/1972 | Japan . |
| 47-45198 | 11/1972 | Japan . |
| 57-77317 | 5/1982 | Japan . |
| 59-45349 | 3/1984 | Japan . |
| 59-45350 | 3/1984 | Japan . |
| 4370219 | 12/1992 | Japan . |

*Primary Examiner*—Newton Edwards
*Attorney, Agent, or Firm*—Sughrue, Mion, Zinn, Macpeak & Seas, PLLC

[57] ABSTRACT

The present invention relates to an elastic fiber of polyester elastomer mainly comprising the polyester elastomer further comprising aromatic polyester component as a hard segment and poly(alkyleneoxide)glycol having a number-average molecular weight of 500 to 5000 as a soft segment, wherein a residual elongation after 400 percent stretching does not exceed 100 percent. Made of the polyester elastomer comprising 1,2-bis[4-(2-hydroxyethyl)phenoxy]ethane as the diol component constituting said aromatic polyester component, or 1,4-benzenediethanol and ethyleneglycol as the diol component constituting said aromatic polyester component, the elastic fiber features excellent elastic properties in the event of great deformation and provides suitable material for clothing.

23 Claims, No Drawings

ELASTIC FIBER, PROCESS FOR THE SAME AND POLYESTER ELASTOMER USED THEREOF

FIELD OF THE INVENTION

The present invention relates to an elastic fiber of polyester elastomer, more specifically to an elastic fiber comprising polyester elastomer and featuring excellent elastic recovery, and to its manufacturing method.

PRIOR ART

It has been known that polyester copolymer, comprising polyester including polyethylene terephthalate as a hard segment and poly(alkyleneoxide) glycol including polytetramethylene glycol as a soft segment, has rubber elasticity, and elastic fiber comprising said elastomer can be obtained.

Polyurethane fiber is known as having superb elastic properties. Said polyurethane fiber features excellent elastic recovery when subjected to substantial deformation, and is extensively used to produce clothing in the field of sports and others including the bathing suit. The elastic properties of this fiber is remarkable; generally, a residual elongation is about 100 percent after stretched 400 percent. Some of the most excellent products are said to have the residual elongation of 50 percent or even less.

However, polyurethane fiber has problems in weatherability and chemical resistance (chlorine based solvent). Poor heat-setting property during processing is also a problem.

Polyester elastomer is generally thermoplastic and provides excellent industrial productivity allowing melt-spinning. However, compared with the polyurethane fiber used conventionally, it is inferior in elastic recovery, especially in recovery when subjected to much deformation (when stretched 400 percent) though it is superior in chemical resistance; therefore, it fails to provide a satisfactory alternative to polyurethane.

As a means of solving the problems of polyester elastomer, it has been proposed to enhance the elastic properties by improving the crystallinity of the hard segment.

Official Gazette of Japanese Patent Laid-open NO. 4-370219 discloses the polyester elastomer-which comprises naphthalene dicarboxylic acid residue or biphenyl dicarboxylic acid residue as acid component of the hard segment, and 1,3-propane diol residue as diol component of the hard segment. However, this elastomer fails to improve elastic property very much in the event of excessive stretching.

Official Gazette of Japanese Patent Publication NO. 47-45198 discloses the polyester elastomer which comprises aromatic dicarboxylic acid residue and aliphatic dicarboxylic acid residue as acid component of the hard segment, and p-benzenediethanol residue as diol component of the hard segment. However, elastic fiber comprising this polyester elastomer failed to show much improvement of recovery from increased stretching. Furthermore, tensile strength is as low as 0.4 g/de or less; this is not practical when it is used as elastic fiber for clothing and other general applications.

Official Gazette of Japanese Patent Laid-open NO. 59-45349 and Official Gazette of Japanese Patent Laid-open NO. 59-45350 disclose the composition comprising the polyester elastomer mixed with the crystal nucleating agent. However, elastic recovery is still insufficient when said polymer composition with increased degree of crystallinity is utilized as an elastomer.

It has also been disclosed to solve said problems by processing technique.

Official Gazette of Japanese Patent Laid-open NO. 57-77317 discloses a process of drawing a elastic fiber comprising a polyester elastomer having polybutyleneterephthalate component as a hard segment, thereby improving elastic properties through relaxing treatment. However, this process is still difficult to ensure recovery from 400 percent stretching.

Official Gazette of Japanese Patent publication NO. 47-14054 discloses a process of improving the strength and recovery from stretching by shrinkage without stretching under heat wherein the elastic fiber comprising a polymer having polyethylene terephthalate component as a hard segment and having poly(alkyleneoxide) glycol component as a soft segment is drawn to 4 times (drawn at the draw ratio of 4) or more. It also contains description of recovery from 300 percent stretching. However, the hard segment of said polymer has a low degree of crystallinity, and fails to ensure improvement recovery from 400 percent stretching.

As described above, regarding a residual elongation after stretching which indicates elastic recovery from stretching, there is no elastic fiber of polyester elastomer whose residual elongation does not exceed 100 percent after 400 percent stretching.

The object of the present invention is to provide an elastic fiber of polyester elastomer featuring excellent elastic properties.

Another object of the present invention is to provide an elastic fiber having excellent elastic properties which mainly comprises a polyester elastomer comprising aromatic polyester component as a hard segment and poly(alkyleneoxide) glycol component with number-average molecular weight of 500 to 5000 as a soft segment, and a residual elongation of the elastic fiber does not exceed 100 percent after 400 percent stretching.

Still another object of the present invention is to provide an elastic fiber of polyester elastomer which has both recovery from substantial stretching and high tensile strength.

A further object of the present invention is to provide an elastic fiber of polyester elastomer which allows melt spinning.

A still further object of the present invention is to provide a polyester elastomer which ensures a useful material for elastic fiber excellent in recovery from stretching.

Still further objects and advantages of the present invention will be clear from the following description.

DISCLOSURE OF THE INVENTION

The objects and advantages of the present invention can be achieved by providing an elastic fiber having excellent elastic properties which mainly comprises a novel polyester elastomer comprising aromatic polyester component as a hard segment and poly(alkyleneoxide) glycol component with number-average molecular weight of 500 to 5000 as a soft segment, and whose residual elongation does not exceed 100 percent after 400 percent stretching.

The elastic fiber of polyester elastomer according to the present invention mainly comprises a polyester elastomer having aromatic polyester component with very high crystallinity as a hard segment and poly(alkyleneoxide) glycol component with number-average molecular weight of 500 to 5000 as a soft segment.

The aromatic polyester component as the hard segment of said polyester elastomer mainly comprises the repeating unit (for example, which comprises 80 moles percent or more of the repeating units) expressed by the following formula (1):

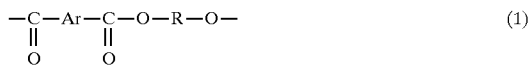

In said formula (1), Ar represents an arylene group having 6 to 20 carbon atoms, and can be exemplified by p-phenylene, m-phenylene, o-phenylene, 2,6-naphthylene, 2,7-naphthylene, 1,5-naphthylene, 4,4-biphenylylene, 2,2-biphenylylene and p-terphenylylene. The p-phenylene, 2,6-naphthylene and 4,4-biphenylylene are preferred as Ar. For Ar, part or whole of the hydrogen in the aromatic ring can be replaced by alkyl group and/or halogen atom. Ar may be of a single type, or more than one type may coexist.

"R" can be selected from, for example, the group consisting of the following constitutional units (A), (B) and (C):

(A) following formula (1)-1

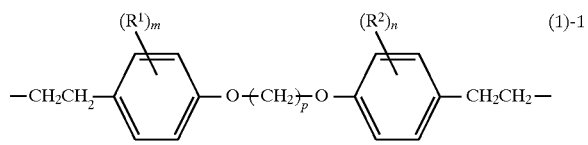

where "p" is an integer of 2 to 4, and "$R^1$" and "$R^2$" are independently an alkyl group having 1 to 4 carbon atoms or a halogen atom. "m" and "n" are independently integers of 0 to 4.

(B) Following formula (1)-2

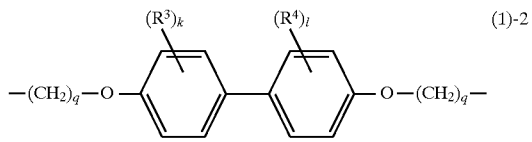

where "q" is an integer of 2 to 4, and "$R^3$" and "$R^4$" are independently an alkyl group having 1 to 4 carbon atoms or a halogen atom. "k" and "l" are independently integers of 0 to 4.

(C) Following formulae (1)-3 and (1)-4

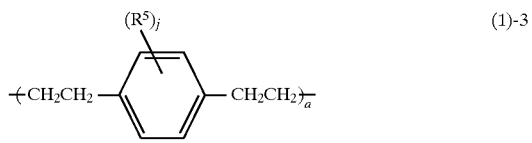

where "$R^5$" is an alkyl group having 1 to 4 carbon atoms or a halogen atom, and "j" is an integer of 0 to 4. "$R^6$" is an alkylene group having 2 to 20 carbon atoms which may contain ether linkage in the molecular chain. "a" and "b" represent independently the numbers of moles of the constitutional unit represented by said formulae (1)-3 and (1)-4, and satisfy the following formula (1)-5:

$$0.01 < b/a < 1.0 \qquad (1)\text{-}5$$

In said formula (1)-1, "p" indicates 2, 3 or 4. The value within this range ensures excellent melt processability and recovery from stretching, and "p" of 2 or 4 is especially preferable.

"$R^1$" and "$R^2$" represent independently an alkyl group having 1 to 4 carbon atoms or a halogen atom.

Methyl and ethyl are the preferred examples of the alkyl group having 1 to 4 carbon atoms.

Chlorine atom and bromine atom can be mentioned as examples of the halogen atom.

"m" and "n" are independently 0, 1, 2, 3 or 4.

The aromatic polyester component mainly comprising the repeating unit expressed in said formula (1) containing the constitutional unit (A) expressed in formula (1)-1 is most preferable when Ar is p-phenylene or 2,6-naphthylene, "p" is 2, and both "n" and "m" are 0.

In said formula (1)-2, "q" is 2, 3 or 4. Value within this range provides excellent melt processability and elastic recovery from stretching. "3" is preferred a value for "q".

"$R^3$" and "$R^4$" are independently an alkyl group having 1 to 4 carbon atoms or a halogen atom.

Methyl and ethyl are the preferred examples of the alkyl group having 1 to 4 carbon atoms.

Chlorine atom and bromine atom can be mentioned as examples of the halogen atom.

"k" and "l" are independently 0, 1, 2, 3 or 4.

The aromatic polyester component mainly comprising the repeating unit expressed in said formula (1) containing the constitutional unit (B) expressed in formula (1)-2 is most preferable when Ar is p-phenylene or 2,6-naphthylene, "q" is 2, and both "m" and "n" are 0.

Said constitutional units (A) and (B) may contain the component induced from alkylene glycol in the amount up to 50 mol percent of the entire component expressed in said formulae (1)-1 or (1)-2. This amount is preferred not to exceed 10 mole percent. Ethylene glycol, propylene glycol and diethylene glycol can be mentioned as said alkylene glycol.

In said formula (1)-3, "$R^5$" is an alkyl group having 1 to 4 carbon atoms or a halogen atom.

Methyl and ethyl are the preferred examples of the alkyl group having 1 to 4 carbon atoms.

Chlorine atom and bromine atom can be mentioned as examples of the halogen atom.

"j" is 0, 1, 2, 3 or 4.

Ethylene, trimethylene, propylene, tetramethylene, hexamethylene, decamethylene, dodecamethylene, -ethylene-O-ethylene- and -ethylene-O-ethylene-O-ethylene- can be mentioned as the alkylene group having 2 to 20 carbon atoms which may contain ether linkage in the molecular chain of "$R^6$" in said formula (1)-4. Two or more of them may be present.

Ethylene is preferred as the alkylene group having 2 to 20 carbon atoms which may contain ether linkage in the molecular chain of "$R^6$".

"a" and "b" represent independently the numbers of moles of the constitutional unit represented by said formulae (1)-3 and (1)-4, and satisfy the following formula (1)-5:

$$0.01 < b/a < 1.0 \qquad (1)\text{-}5$$

It represents the ratio between the number of moles "a" of p-benzenediethanol component and the number of moles "b" of alkylene glycol component as the diol component of polyester elastomer. When "b/a" is 0.01 or less, oligomer is segregated in the initial stage of polymerization, and it is difficult to get polyester elastomer of a high degree of polymerization. Moreover, mechanical properties of the elastic fiber are degraded by the segregated oligomer. When b/a is not less than 1.0, elastic properties tend to decrease because of increase in the percentage of the non-crystalline aromatic polyester component.

The aromatic polyester component mainly comprising the repeating unit expressed in said formula (1) containing the constitutional unit (c) expressed in formulae (1)-3 and (1)-4 is preferable when Ar is p-phenylene or 2,6-naphthylene, "j" is 0, and "$R^6$" is ethylene.

The aromatic polyester component constituting the hard segment of said polyester elastomer mainly comprises the repeating unit expressed in said formula (1). It may contain other repeating units in amounts not exceeding 50 mole percent preferably not exceeding 40 mole percent, more preferably not exceeding 30 mole percent, still more preferably not exceeding 20 mole percent, especially preferably not exceeding 10 mole percent.

Other repeating units can be exemplified by ethylene terephthalate unit, tetramethylene terephthalate unit, hexamethylene terephthalate unit, ethylene isophthalate unit, ethylene (terephthalatelisophthalate) unit, ethylene-2,6-naphthalate unit, tetramethylene-2,6-naphthalate unit and hexamethylene-2,6-naphthalate unit.

Poly(alkyleneoxide) glycol component is as the soft segment constituting the polyester elastomer used in the present invention. Polyethylene glycol, polypropylene glycoland polytetramethylene glycol as poly(alkyleneoxide) glycol can be mentioned as preferred examples of the poly (alkyleneoxide) glycol component.

Furthermore, the poly(alkyleneoxide) glycol component can be not only the single polymer of said component, but also the random copolymer or block copolymer consisting of two or more types of said component. It can also be a mixed polymer comprising mixtures of two or more types of said single polymer or said copolymer consisting of two or more types of the above.

A single polymer of polytetramethylene glycol is preferred as preferred examples of the poly(alkyleneoxide) glycol component.

The number-average molecular weight of said poly (alkyleneoxide) glycol component is from 500 to 5000. When it is less than 500, the length of the soft segment of the obtained elastomer is too small to get a sufficient elasticity due to poor elongation. If the number-average molecular weight is over 5000, fiber strength and/or elasticity will tend to decrease; this fails to meet the required properties. The preferred number-average molecular weight of the poly(alkyleneoxide) glycol is from 1000 to 4000.

The polyester elastomer used in the present invention may contain as a soft segment the component other than poly (alkyleneoxide) glycol having a number-average molecular weight from 500 to 5000—for example, an aliphatic polyester—in the amount not exceeding 20 weight percent or less, preferably 10 weight percent or less.

The preferred amount of poly(alkyleneoxide) glycol component according to the present invention is 30 to 95 weight percent of the polyester elastomer. If the weight percent is over 95, melting point of said elastomer will be too low, resulting abrupt reduction in elasticity through heat treatment under dry or wet environment This may produce less durable elastic fiber. More preferable amount of poly (alkyleneoxide) glycol component is from 50 to 90 weight percent of the polyester elastomer.

The polyester elastomer having its hard segment composed of said constitutional unit (C) expressed in said formulae (1)-3 and (1)-4 can be effectively used when the diol components of polyester elastomer satisfy the following formula (1)-6, where the number of moles of poly (alkyleneoxide) glycol component is assumed "c":

$$0.05 < a/(a+b+c) < 0.6 \tag{1-6}$$

where "a" and "b" are defined the same as those of said formulae (1)-3 and (1)-4. When a/(a+b+c) is not less than 0.6, crystals with high melting point will be contained in polyester elastomer, resulting in poorer melt-processing properties. When it does not exceed 0.05, fiber crystallinity will be reduced, resulting in slower solidification during melt-shaping.

The inherent viscosity of the polyester elastomer used in the present invention (IV) (with measuring solvent of phenol/1,1,2,2-tetrachloroethane=⅘ (in weight percentage) at the measuring temperature of 35 degrees Celsius) ranging from 0.5 to 13.0 is preferred for improvement in elasticity. If the IV value is below 0.5, sufficient elongation and/or strength cannot be ensured, and elastic properties tend to be poorer. When the IV exceeds 13.0, melting viscosity will be increased, resulting in poorer melt-processability. The more preferred IV value is 1.0 to 12.0.

The polyester elastomer used in the present invention can be identified by measurement of melting point, element analysis, infrared absorption spectrum (IR), nuclear magnetic resonance analysis (NMR), etc.

The polyester elastomer used in the present invention can be prepared by the conventionally known melt-polymerization process, using, for example, the aromatic dicarboxylic acid ester derivative such as dimethyl terephthalate which is the aromatic polyester component constituting the hard segment, diol compound which induces the component expressed in said formula (1)-1, and poly (alkyleneoxide) glycol which is the component of the soft segment. It is also possible to use the process of removing the diol having low boiling point by transesterification using aromatic dicarboxylic acid diglycol ester, or by esterification using aromatic dicarboxylic acid and the diol with low boiling point.

To be more specific, it is also possible to use the following process; said materials are put into vessels and are subjected to transesterification or esterification in the presence or absence of catalyst, and are polycondensed under high vacuum in the presence of catalyst, thereby getting a desired degree of polymerization.

Such a compound as titanium, niobium, germanium and antimony can be used as polycondensation catalyst.

The polyester elastomer described above can be subjected to melt-spinning and melt-molding by the conventional process. In this case, it can be processed into fiber, film and other forms of molded products according to the general thermoplastic polymer melt spinning and melt molding process. Furthermore, processing conditions can be set as desired, like the conventional polyester. That is, said polyester elastomer can be easily formed into fiber, film and other shaped articles, so it can be used in various forms; this implies that its industrial contributions are extremely significant. Especially when it is used as the fiber, excellent elastic recovery is ensured by the conventional melt spinning process.

Preparation conditions for elastic fiber of polyester elastomer according to the present invention can be exemplified as follows: This polymer is molten at (melting point of said polymer (mp)+10) degrees Celsius or more and (mp+80) degrees Celsius or less, more preferably, at (mp of said polymer+10) degrees Celsius or more and (mp+60) degrees Celsius or less, and is extruded from the spinning nozzle and is wound up to be formed into an undrawn fiber. The spinning draft in this case is not less than 5 times, preferably, not less than 20 times.

The undrawn (as-spun) fiber obtained in this way has superb elastic recovery, and can be used as elastic fiber alone. In order to improve elastic properties and breaking strength, however, it is preferred that the undrawn (as-spun) fiber is subjected to drawing operation and/or heat treatment.

For example, the polyester elastomer where said "R" is the constitutional unit expressed in said formula (1)-1, and the polyester elastomer where said "R" is the constitutional unit expressed in said formulae (1)-3 and (1)-4 are heat-treated at not less than 40 degrees Celsius after the obtained undrawn fiber has been drawn at least 1.3 of draw ratio. Then it is formed into elastic fiber featuring superb recoverability from stretching and residual elongation after 400 percent stretching.

Draw ratio in this case is 1.3 times or more and is below the stretch magnification at break. Higher draw rario leads to better fiber properties; it should preferably be 1.5 ratio, and below the maxinm draw ratio Drawing temperature should be above the room temperature, and should preferably be 40 degrees Celsius or more and (mp–5) degrees Celsius or less.

According to the present invention, heat treatment under preferred conditions is the treatment made below the maximum shrinkage ratio at that treatment temperature when the shrinkage ratio is 5% or more. The shrinkage ratio can be defined by the following formula (2) when fiber length before treatment is La and fiber length after treatment is Lb:

$$\text{Shrinkage ratio} = (1 - Lb/La) \times 100(\%) \tag{2}$$

This heat treatment is available in two types: (1) treatment at the maximum shrinkage ratio at a certain temperature and (2) treatment below maximum shrinkage ratio. The former method provides treatment when the fiber is kept in free shrinkage and is virtually unstretched. The latter method provides treatment when a certain tension is applied to the fiber.

When the temperature for heat treatment is set to 40 degrees Celsius or more, fiber will have more excellent elastic recovery. Furthermore, the upper limit of the temperature is below the melting point of said elastomer. Shrinkage and heat treatment temperature should preferably be not less than temperature for drawing treatment, and below (melting temperature of said elastomer–5) degrees Celsius.

It is possible to add some other thermoplastic polymer, heat stabilizer, light stabilizer, delustering agent, pigment, anti-oxidizing agent, ultraviolet absorbent, plasticizer, lubricant, flame retardant, mold parting agent, nucleating agent, filler, chain elongation agent or elongation improver to the polyester elastomer used in the present invention, as required.

Heat stabilizers are exemplified by those based on hindered phenol, amine, sulfur, phosphor, carbodiimide, imide and amide; of these agents, those based on hindered phenol, amine, sulfur are used in preference.

Heat stabilizer to be added to polyester elastomer should be 5 weight percent or less, or preferably in the range from 0.01 to 5 weight percent.

Furthermore, it is also possible to add other thermoplastic polymers such as polyesters as reformer in small amounts (for example, not exceeding 20 weight percent, or preferably, not exceeding 10 weight percent) to said polyester elastomer. Other thermoplastic polymers includes polyester, polyamide, polycarbonate and polystyrene.

Polyester elastomer used in the present invention has excellent fiber formability by melt spinning. When it is formed into fiber, residual elongation after 400 percent stretching does not exceed 100 percent, showing excellent elastic recovery. Furthermore, when residual elongation after 400 percent stretching does not exceed 50 percent preferably, its elastic properties are much superior to those of a conventional polyester elastomer, and are extremely useful when it is used to manufacture clothing or the like.

Furthermore, the draw ratio of said polyester elastomer fiber should preferably be selected to make sure that the strength at break is not less than 0.5 g/de. The higher the strength, the better for it; however, the upper limit is 5 g/de in practice.

Elastic fiber of polyester elastomer according to the present invention can be used in combination with other fibers or used as covering yarn with other fibers. Especially when it is used in combination with polyester fiber, elastic fiber of polyester elastomer can be dyed under the dyeing conditions of said polyester fiber.

EFFECTS OF THE INVENTION

While elastic fiber of polyester elastomer according to the present invention permits melt polymerization and melt spinning, it ensures high elastic recovery comparable to that of urethane based elastomer, when the aromatic polyester having a high degree of crystallinity, that is, a high intermolecular cohesive force is used as a hard segment. Especially when the undrawn fiber obtained is subjected to thermal shrinkage at 40 degrees Celsius or more after being drawn at the draw ratio of 1.3, it is possible to provide the highly elastic fiber where residual elongation after 400 percent stretching does not exceed 100 percent.

Especially in the polyester elastomer having the constitutional unit expressed in said formulae (1)-3 and (1)-4, the hard segment exhibits a very high crystallinity; this results from simultaneous use of aromatic dicarboxylic acid component and p-benzenediethanol component. However, the polymer consisting of these two components has a high melting point, so crystals with high melting point are segmented at the time of polymerization or solidification. This will deteriorate polymerizability, melt-processability and elastic properties after being made into fiber. According to the method of preventing crystals with high melting point from being segmented by combined use of aliphatic dicarboxylic acid as an acid component (Official Gazette of Japanese Patent Publication NO. 47-45198), reduced crystallinity of the polymer requires use of a great deal of p-benzenediethanol. Use of a great deal of hard segment tends to increase the internal friction of the elastomer, and is not preferred from the viewpoint of improving elastic properties.

It has been found out that, for the aromatic polyester component having the constitutional unit (C) expressed in said formulae (1)-3 and (1)-4 as a hard segment, the crystal of high melting point can be prevented from being segmented, without reducing the crystallinity of polyester elastomer, by using aromatic dicarboxylic acid component, p-benzenediethanol component and alkylene glycol component, as well as by application of a specific range of composition for diol component. Accordingly, polyester elastomer according to the present invention allows the hard segment of high crystallinity to be formed, by using a small amount of p-benzenediethanol, thereby reducing the percentage of hard segment in polyester elastomer. This contributes to a substantial improvement of the elasticity of elastic fiber, and provides economic advantages because it requires use of only a small amount of expensive p-benzenediethanol.

Polyester elastomer according to the present invention has excellent elastic properties, resistance against chemicals, heat setting property and melt-processability , and can be used over an extensive field to produce fiber, film and other molded products. Especially when it is used to manufacture fiber, it exhibits superb fiber-formability and elastic recoverability, and is very useful when it is used in the field of sports as the swimming suit or the like, or when it is used as various types of clothing such as stockings.

EXAMPLES

The following gives concrete description of the present invention with reference to examples, without the present invention being restricted thereto. The physical properties of the fiber have been evaluated at 25 degrees Celsius and relative humidity of 65 percent.

(1) The intrinsic viscosity of polyester elastomer was measured at the temperature of 35 degrees Celsius and concentration of 12 mg/ml using the solvent consisting of a mixture of phenol and 1,1,2,2-tetrachloroethane=⅖ (in weight percentage).

(2) The melting point was measured at a temperature rise speed of 50 degrees Celsius/min., using the DSC.

(3) Percentage of diol in the polymer was calculated on the basis of peak integrated intensity ratio resulting from aliphatic hydrogen of each diol obtained from proton NMR measurement.

(4) To get the recoverability of elastic fiber from x-percent stretching (method A), a 10 cm long sample was stretched by x-percent at a head speed of 50 cm/min. (500%/min.) at 25 degrees Celsius, using the tensile test equipment. It was left to stand for ten minutes while it was stretched; then it was left to stand for ten minutes after stress was released. From the resulting length B and length A before being stretched, said recoverability was calculated on the basis of the following formula:

$$(2A-B)/A \times 100(\%)$$

(5) To get the recoverability of elastic fiber from x-percent stretching (method B), a 10 cm long sample was stretched by x-percent at a head speed of 50 cm/min. (500%/min.) at 25 degrees Celsius, using the tensile test equipment. The chuck was immediately returned to the original position at said speed, without keeping it stretched. From the length L-cm of the sample when the stress is reduced to zero, said recoverability was calculated on the basis of the following formula:

$$[x-(L-10) \times 10]/x) \times 100 \ (\%)$$

(6) To get the x-percent residual elongation, a 10 cm long sample was stretched by x-percent at a head speed of 50 cm/min. (500%/min.), using the TENSILON tensile testing machine. The chuck was immediately returned to the original position at said speed. The length L-cm of the sample was measured when stress just started to apply by stretching it again at said speed. Then said x-percent residual elongation was calculated on the basis of the following formula:

$$[(L-10)/10] \times 100(\%)$$

(7) Strength and elongation at break was measuring by stretching a 2.5 cm long sample at a head speed of 50 cm/min., using the TENSILON tensile testing machine.

Example 1

5.06 g (0.020 mol) of bis(2-hydroxyethyl)terephthalate, 3.02 g (0.01 mol) of 4,4'-bis(3-hydroxypropoxy)biphenyl expressed in the following formula, 20.00 g of poly (tetramethyleneoxide)glycol (by Hodogaya Chemical Co., Ltd., with number-average molecular weight of 2000), and 2.04 mg (0.0076 mmol) of tetrabutyltitanate were placed into the reactor equipped with stirrer and vacuum distillation system.

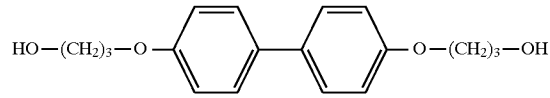

Polymerization was carried out in nitrogen gas under normal pressure at 240 degrees Celsius for 30 minutes, at 20 mmHg for 15 minutes, and at 0.3 mmHg for 60 minutes. The polymer obtained in this way had an intrinsic viscosity of 2.7, and a melting point of 190 degrees Celsius. This polymer was molten at 210 degrees Celsius and was spun at the speed of 5 m/min. The undrawn elastic filament obtained in this process has 100 de and a strength at break of 0.25 g/de. Table 1 shows the recoverability of this undrawn elastic filament from stretching (method B). Poly (tetramethyleneoxide)glycol component contained during polymerization is accounted for 78 weight percent.

The molar ratio between 4,4'-bis(3-hydroxypropoxy) biphenyl component and ethylene glycol component in the polymer obtained from the distillate monomer during polymerization was 98 to 2.

Example 2

5.34 g (0.021 mol) of bis(2-hydroxyethyl)terephthalate, 3.32 g (0.011 mol) of 1,2-bis[4-(2-hydroxyethyl)phenoxy] ethane expressed in the following formula, 20.00 g of poly(tetramethyleneoxide)glycol (by Hodogaya Chemical Co., Ltd., with number-average molecular weight of 2000), and 2.04 mg (0.0076 mmol) of tetrabutyltitanate were placed into the reactor equipped with stirrer and vacuum distillation system.

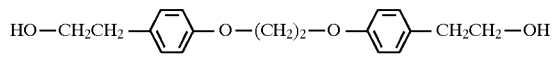

Polymerization was carried out in nitrogen gas under normal pressure at 240 degrees Celsius for 30 minutes, at 20 mmHg for 15 minutes, and at 0.3 mmHg for 60 minutes. The polymer obtained in this way had an intrinsic viscosity of 3.5, and a melting point of 200 degrees Celsius. This polymer was molten at 220 degrees Celsius and was spun at the speed of 5 m/min. The undrawn elastic filament obtained in this process has 100 de and a strength at break of 0.25 g/de. Table 1 shows the recoverability of this undrawn elastic filament from stretching (method B). Said polymer was the elastomer consisting of 10.6 weight percent of terephthalic acid component, 12.7 weight percent of 1,2-bis [4-(2-hydroxyethyl)phenoxy]ethane component and 76.7 weight percent of poly(tetramethyleneoxide)glycol component.

The molar ratio between 1,2'-bis[4-(2-hydroxyethyl) phenoxy]ethane component and ethylene glycol component in the polymer obtained from the distillate monomer during polymerization was 98 to 2.

Example 3

4.148 g (0.017 mol) of 2,6-naphthalene dicarboxylic acid dimethyl ester, 2.093 g (0.07 mol) of 1,2-bis[4-(2-hydroxyethyl)phenoxy]ethane, 20.00 g of poly (tetramethyleneoxide)glycol (by Hodogaya Chemical Co., Ltd., with number-average molecular weight of 2000), 1.054 g (0.017 mol) of ethyleneglycol and 1.734 mg (0.0051 mmol) of tetrabutyltitanate were placed into the reactor equipped with stirrer and vacuum distillation system. After transesterification was carried out under normal pressure in nitrogen gas at 190 degrees Celsius for 30 minutes, the temperature rose to 240 degrees Celsius, and polymerization was carried out under normal pressure for 30 minutes, at 20 mmHg for 15 minutes, and at 3 mmHg for 60 minutes. The polymer obtained in this way had an intrinsic viscosity of 6.1, and a melting point of 207 degrees Celsius. This polymer was molten at 235 degrees Celsius and was spun at the speed of 5 m/min. Table 1 illustrates the recoverability from stretching (method B) of the undrawn elastic filament obtained in this process.

The mol ratio between said compound (II) and ethylene glycol in the polymer obtained from the distillate monomer during polymerization was 99 to 1. Such undrawn elastic fiber exhibited 100 de with a strength at break of 0.44 g/de and a elongation of 1322%.

[Comparative Example 1]

The prevent inventors carried out the same polymerization as Example 1 except that transesterification was performed in the initial period of reaction at 220 degrees Celsius for 90 minutes, using 18.53 g (0.096 mol) of dimethyl terephthalate, 12.87 g (0.143 mol) of tetramethylene glycol, 36.6 g of poly(tetramethyleneoxide)glycol (by Hodogaya Chemical Co., Ltd., with number-average molecular weight of 2000), and 9.7 mg (0.0285 mol) of tetrabutyltitanate. The polymer obtained in this way had an intrinsic viscosity of 2.4, and a melting point of 185 degrees Celsius. This polymer was molten at 210 degrees Celsius and was spun at the speed of 5 m/min. Table 1 illustrates the recoverability from stretching (method B) of the undrawn elastic filament obtained in this process.

TABLE 1

| | Recoverability from stretching (method B) | |
|---|---|---|
| | 200% | 400% |
| Example 1 | 91 | 69 |
| Example 2 | 91 | 78 |
| Example 3 | 93 | 84 |
| Comparative Example 1 | 73 | 61 |

Example 4

6.604 g (0.026 mol) of bis(2-hydroxyethyl)terephthalate, 2.158 g (0.013 mol) of p-benzenediethanol, 20.00 g of poly(tetramethyleneoxide)glycol (by Hodogaya Chemical Co., Ltd., with number-average molecular weight of 2000) and 2.65 mg (0.0078 mmol) of tetrabutyltitanate were placed into the reactor equipped with stirrer and vacuum distillation system. Polymerization was carried out under normal pressure in nitrogen gas at 240 degrees Celsius for 30 minutes, at 20 mmHg for 30 minutes, and at 0.3 mmHg for 60 minutes. After polymerization, 0.2 weight percent of hindered phenol-based compound was added to the polymer as heat stabilizer. For the polymer obtained in this process, "R" in said formula (1) is the elastomer represented in said formulae (1)-3 and (1)-4; it had an intrinsic viscosity of 3.8, and a melting point of 193 degrees Celsius with a/(a+b+c)=0.45, b/a=0.30.

This elastomer was molten at 230 degrees Celsius and was spun at the delivery rate of 0.062 g/min. and at the speed of 5 m/min., using the spinneret (hole diameter 0.3 mm, L/D 2.33), thereby obtaining the undrawn elastic fiber. The undrawn elastic fiber obtained in this process was drawn at the draw ratio of 9 at 40 degrees Celsius; then it was subjected to shrinkage heat treatment (shrinkage rate obtained in said formula (2): 56%) at 130 degrees Celsius to get elastic fiber. Table 2 illustrates the recoverability from 100 percent stretching (method A) of the undrawn elastic filament obtained in this process, that from 200 percent stretching (method B) and that from 400 percent stretching (method B).

The filament processed in said manner had 34 de with a strength at break of 0.73 g/de and elongation of 750%.

Example 5

The inventors carried out the same polymerization, spinning and processing as Example 1 except that 6.096 g (0.024 mol) of bis(2-hydroxyethyl)terephthalate, 2.324 g (0.014 mol) of p-benzenediethanol, 20.00 g of poly(tetramethyleneoxide)glycol (by Hodogaya Chemical Co., Ltd., with number-average molecular weight of 2000) and 2.45 mg (0.0072 mmol) of tetrabutyltitanate were used. For the polymer obtained in this process, "R" in said formula (1) is the elastomer represented in said formulae (1)-3 and (1)-4; it had an intrinsic viscosity of 3.7, and a melting point of 187 degrees Celsius with a/(a+b+c)=0.48, b/a=0.18.

Table 2 illustrates the recoverability from 100 percent stretching (method A) of the filament obtained in this process, that from 200 percent stretching (method B) and that from 400 percent stretching (method B).

The filament processed in said manner had 33 de with a strength at break of 0.65 g/de and elongation of 970%.

Example 6

The inventors carried out the same polymerization, spinning and processing as Example 1 except that 4.392 g (0.018 mol) of 2,6-naphthalene dicarboxylic acid dimethyl ester, 1.328 g (0.008 mol) of p-benzenediethanol, 20.00 g of poly(tetramethyleneoxide)glycol (by Hodogaya Chemical Co., Ltd., with number-average molecular weight of 2000), 1.116 g (0.018 mol) of ethyleneglycol and 1.84 mg (0.0054 mmol) of tetrabutyltitanate were used, and that transesterification was performed in the initial period of polymerization at 220 degrees Celsius for 30 minutes. For the polymer obtained in this process, "R" in said formula (1) is the elastomer represented in said formulae (1)-3 and (1)-4; it had an intrinsic viscosity of 3.7, and a melting point of 185 degrees Celsius with a /(a+b+c)=0.31, b/a=0.18.

Table 2 illustrates the recoverability from 100 percent stretching (method A) of the filament obtained in this process, that from 200 percent stretching (method B) and that from 400 percent stretching (method B).

The filament processed in said manner had 34 de with a strength at break of 0.63 g/de and elongation of 900 %.

TABLE 2

| | Strength at break (g/de) | Elongation at break (%) | Recoverability from stretching | | method A |
|---|---|---|---|---|---|
| | | | method B | | |
| | | | 200% | 400% | 100% |
| Example 4 | 0.73 | 750 | 97 | 76 | 98 |
| Example 5 | 0.65 | 970 | 96 | 63 | 97 |
| Example 6 | 0.63 | 900 | 96 | 84 | 97 |

Example 7

63.44 g (0.260 mol) of 2,6-naphthalene dicarboxylic acid dimethyl ester, 32.000 g (0.106 mol) of 1,2-bis[4-(2-hydroxyethyl)phenoxy]ethane represented in the following formula, 299.6 g of poly(tetramethyleneoxide)glycol (by Hodogaya Chemical Co., Ltd., with number-average molecular weight of 1979), 32.20 (0.520 mol) of ethyleneglycol and 26.5 mg (0.0779 mmol) of tetrabutyltitanate were placed into the reactor equipped with stirrer and vacuum distillation system.

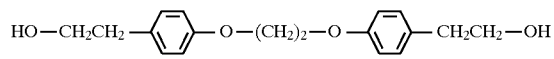

After transesterification was carried out under normal pressure in nitrogen gas at 200 degrees Celsius for 60 minutes, the temperature rose to 240 degrees Celsius, and polymerization was carried out under normal pressure for 30 minutes, at 20 mmHg for 30 minutes, and at 0.3 mmHg for 120 minutes. For the polymer obtained in this process, "R" in said formula (1) is the polymer represented in said formula (1)-1 (where p is 2, both m and n are zero); it had an intrinsic viscosity of 11.5, and a melting point of 188 degrees Celsius.

This elastomer was molten at 240 degrees Celsius and was spun at the delivery rate of 1.0 g/min. and at the speed of 70 m/min., using the spinneret (hole diameter 0.6 mm, L/D 2.0). The undrawn elastic fiber obtained in this process was drawn at the draw ratio of 3.8 times at 40 degrees Celsius; then it was subjected to shrinkage heat treatment (shrinkage rate: 62%) at 130 degrees Celsius and was taken up. Table 3 illustrates the recoverability from 100 percent stretching of the undrawn elastic filament obtained in this process, that from 200 percent stretching and residual elongation after 400 percent stretching as well as strength at break.

The mol ratio between 1,2-bis[4-(2-hydroxyethyl)phenoxy]ethane and ethylene glycol in the polymer obtained from NMR measurement was 98 to 2. Said elastic fiber exhibited 87 de with a elongation of 750%.

Example 8

55.77 g (0.2875 mol) of dimethyl terephthalate ester, 26.97 g (0.1625 mol) of 1,4-benzenediethanol represented in the following formula, 247.4 g of poly(tetramethyleneoxyde)glycol (by Hodogaya Chemical Co., Ltd., with number-average molecular weight of 1979), 20.15 (0.325 mol) of ethyleneglycol and 29.3 mg (0.0862 mmol) of tetrabutyltitanate were placed into the reactor equipped with stirrer and vacuum distillation system.

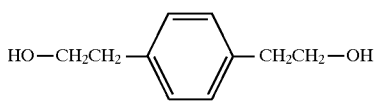

After transesterification was carried out under normal pressure in nitrogen gas at 200 degrees Celsius for 60 minutes, the temperature rose to 240 degrees Celsius, and polymerization was carried out under normal pressure for 30 minutes, at 20 mmHg for 30 minutes, and at 0.3 mmHg for 120 minutes. For the polymer obtained in this process, "R" in said formula (1) is the polymer represented in said formulae (1)-3 and (1)-4; it had an intrinsic viscosity of 7.0, and a melting point of 189 degrees Celsius.

This elastomer was molten at 230 degrees Celsius and was spun at the delivery rate of 1.0 g/min. and at the speed of 70 m/min., using the spinneret (hole diameter 0.6 mm, L/D 2.0). The undrawn elastic fiber obtained in this process exhibited 128 de, a strength at break of 0.55 g/de, elongation of 75%, 94 percent recoverability from 200-percent stretching (method B) and 117 percent residual elongation after 400 percent stretching.

The undrawn elastic fiber obtained in this process was drawn at the draw ratio of 3.3 times at 40 degrees Celsius; then it was subjected to shrinkage heat treatment (shrinkage rate: 74%) at 130 degrees Celsius through the non-contact type heating cylinder. Table 3 illustrates the recoverability from 100 percent stretching of the undrawn elastic filament obtained in this process, that from 200 percent stretching and residual elongation after 400 percent stretching as well as strength at break.

The mol ratio between 1,4-benzenediethanol component and ethylene glycol component in the polymer obtained from NMR measurement was 87 to 13. Said elastic fiber exhibited 146 de with a elongation of 909%.

TABLE 3

| | Strength at break (g/de) | Elongation (%) | Recoverability from stretching (method A) | | Residual elongation after 400 percent stretching (%) |
|---|---|---|---|---|---|
| | | | 100% | 200% | |
| Example 7 | 0.97 | 750 | 98 | 94 | 46 |
| Example 8 | 0.55 | 909 | 99 | 97 | 34 |

[Comparative Example 2]

The inventors carried out the same polymerization as Comparative Example 1 using 186.2 g (0.960 mol) of dimethyl terephthalate, 128.7 g (1.43 mol) of tetramethylene glycol, 366 g of poly(tetramethyleneoxide)glycol (by Hodogaya Chemical Co., Ltd., with number-average molecular weight of 2000), and 97.9 (0.285 mol) of tetrabutyltitanate.

The polymer obtained in this process had an intrinsic viscosity of 4.4, and a melting point of 183 degrees Celsius. This polyester elastomer was molten at 230 degrees Celsius and was spun at the speed of 225 m/min. The undrawn filament obtained in this process exhibited 39 de, a strength at break of 1.0 g/de, elongation at break of 790%, 74 percent from 200-percent stretching (method B) and 219 percent residual elongation after 400 percent stretching.

What is claimed is:

1. An elastic fiber of polyester elastomer wherein; said elastic fiber mainly comprises a polyester elastomer comprising an aromatic polyester component as a hard segment and a poly(alkyleneoxide)glycol component having a number-average molecular weight of 500 to 5000 as a soft segment and, a residual elongation of the elastic fiber does not exceed 100 percent after 400 percent stretching.

2. An elastic fiber of polyester elastomer according to claim 1 wherein strength at break of the elastic fiber is 0.5 g/de or more.

3. An elastic fiber of polyester elastomer according to claim 1 wherein said aromatic polyester compound as said hard segment mainly comprises a repeating unit expressed in the formula (1);

in said formula (1), "Ar" represents an arylene group having 6 to 20 carbon atoms where part or all of hydrogen in the aromatic ring can be replaced by an alkyl group and/or a halogen atom, and "R" is at least one of constitutional units selected from the group consisting of the following formulae (A), (B) and (C):

(A) Formula (1)-1

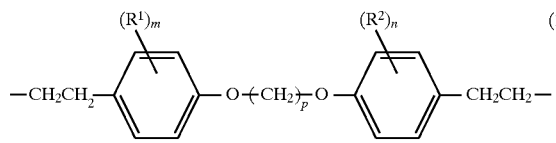

where "p" is an integer of 2 to 4, "$R^1$" and "$R^2$" are independently an alkyl group having 1 to 4 carbon atoms or a halogen atom, "m" and "n" are independently integers of 0 to 4;

(B) Formula (1)-2

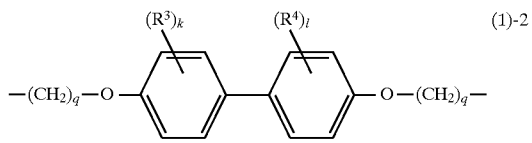

where "q" is an integer of 2 to 4, "$R^3$" and "$R^4$" are independently an alkly group having 1 to 4 carbon atoms or a halogen atom, "k" and "l" are independently integers of 0 to 4; and (C) Formulae (1)-3 and (1)-4

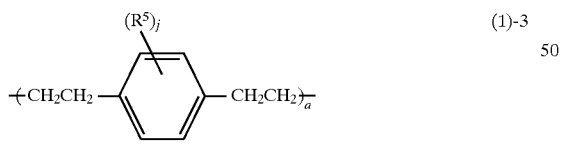

where "$R^5$" is an alkyl group having 1 to 4 carbon atoms or a halogen atom; "j" is an integer of 0 to 4; "$R^6$" is an alkylene group having 2 to 20 carbon atoms which may contain an ether linkage in the molecular chain; said "a" and "b" denote the numbers of moles for the constitutional units represented in said formulae (1)-3 and (1)-4, respectively, and the formula (1)-5 is satisfied:

$$0.01 < b/a < 1.0 \qquad (1)\text{-}5.$$

4. An elastic fiber of polyester elastomer according to claim 3 wherein "Ar" in said formula (1) is selected from the group consisting of a p-phenylene group, a 2,6-naphthylene group and a 4,4'-biphenylylene group.

5. An elastic fiber of polyester elastomer according to claim 3 wherein the content of poly(alkyleneoxide) glycol component is within the range from 30 to 95 weight percent of the polyester elastomer.

6. An elastic fiber of polyester elastomer according to claim 3 wherein the inherent viscosity of the polyester elastomer (IV) (with measuring solvent of phenol/1,1,2 2-tetrachloroethane=⅙ (in weight percentage) at the measuring temperature of 35 degrees Celsius) is within the range from 0.5 to 13.0.

7. An elastic fiber of polyester elastomer according to claim 3 wherein "Ar" is a p-phenylene group or a 2,6-naphthylene group in said formula (1); "R" is the constitutional unit expressed in said formula (1)-1; "p" in said formula (1)-1 is 2; and both "m" and "n" are zero.

8. An elastic fiber of polyester elastomer according to claim 7 wherein the content of poly(alkyleneoxide) glycol component is within the range from 50 to 90 weight percent of the polyester elastomer.

9. An elastic fiber of polyester elastomer according to claim 3 wherein "Ar" is a p-phenylene group or a 2,6-naphthylene group in said formula (1); "R" is the constitutional unit expressed in said formula (1)-2; "q" in said formula (1)-2 is 2; and both "k" and "l" are zero.

10. An elastic fiber of polyester elastomer according to claim 9 wherein the content of poly(alkyleneoxide) glycol component is within the range from 50 to 90 weight percent of the polyester elastomer.

11. An elastic fiber of polyester elastomer according to claim 3 wherein "Ar" is a p-phenylene group or a 2,6-naphthylene group in said formula (1); "R" is the constitutional unit expressed in said formulae (1)-3 and (1)-4; "j" in said formula (1)-3 is 0; "$R^6$" in formula (1)-4 is an ethylene group; and said formula (1)-5 is satisfied.

12. An elastic fiber of polyester elastomer according to claim 11 wherein the polyester elastomer satisfies the formula (1)-6:

$$0.05 < a/(a+b+c) < 0.6 \qquad (1)\text{-}6$$

where "c" denotes the number of moles of poly (alkyleneoxide) glycol component; and "a" and "b" are defined the same as those of said formulae (1)-3 and (1)-4.

13. An elastic fiber of polyester elastomer according to claim 2 wherein said aromatic polyester component as said hard segment mainly comprises a repeating unit expressed in the formula (1);

in said formula (1), "Ar" represents an arylene group having 6 to 20 carbon atoms where part or all of hydrogen in the aromatic ring can be replaced by an alkyl group and/or a halogen atom, and "R" is at least one of constitutional units selected from the group consisting of the following formulae (A), (B) and (C):

(A) Formula (1)-1

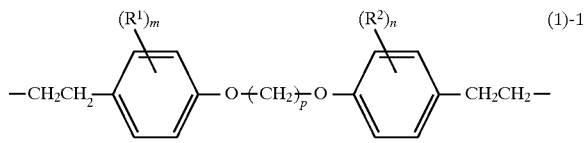

where "p" is an integer of 2 to 4, "$R^1$" and "$R^2$" are independently an alkyl group having 1 to 4 carbon atoms or a halogen atom, "m" and "n" are independently integers of 0 to 4;

(B) Formula (1)-2

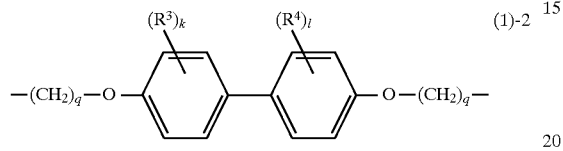

where "q" is an integer of 2 to 4, "$R^3$" and "$R^4$" are independently an alkyl group having 1 to 4 carbon atoms or a halogen atom, "k" and "l" are independently integers of 0 to 4; and (C) Formulae (1)-3 and (1)-4

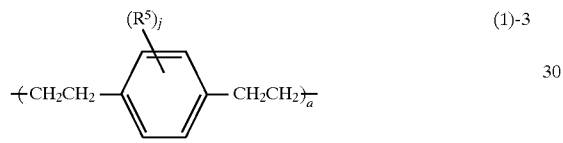

where "$R^5$" is an alkyl group having 1 to 4 carbon atoms or a halogen atom; "j" is an integer of 0 to 4; "$R^6$" is an alkylene group having 2 to 20 carbon atoms which may contain an ether linkage in the molecular chain; said "a" and "b" denote the number of moles for the constitutional units represented in said formulae (1)-3 and (1)-4, respectively, and the formula (1)-5 is satisfied:

$$0.01 < b/a < 1.0 \tag{1)-5.}$$

14. A process for preparing an elastic fiber of polyester elastomer, comprising the steps of;

melt-spinning said polyester elastomer, drawing the obtained fiber at the draw ratio of 1.3 or more, and then heat-treating at the temperature of 40 degrees Celsius or more;

wherein said polyester elastomer mainly comprises the repeating unit expressed by the formula (1):

in said formula (1), "Ar" represents an arylene group having 6 to 20 carbon atoms where part or all of hydrogen in the aromatic ring can be replaced by an alkyl group and/or a halogen atom, and "R" is at least one of constitutional units selected from the group consisting of the following formulae (A), (B) and (C):

(A) Formula (1)-1

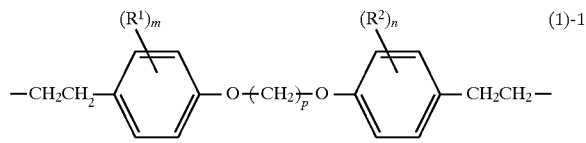

where "p" is an integer of 2 to 4, "$R^1$" and "$R^2$" are independently an alkyl group having 1 to 4 carbon atoms or a halogen atom, "m" and "n" are independently integers of 0 to 4;

(B) Formula (1)-2

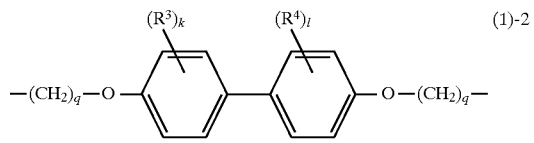

where "q" is an integer of 2 to 4; "$R^3$" and "$R^4$" are independently an alkyl group having 1 to 4 carbon atoms or a halogen atom; "k" and "l" are independently integers of 0 to 4; and (C) Formulae (1)-3 and (1)-4

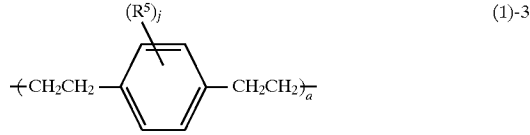

where "$R^5$" is an alkyl group having 1 to 4 carbon atoms or a halogen atom; "j" is an integer of 0 to 4; "$R^6$" is an alkylene group having 2 to 20 carbon atoms which may contain an ether linkage in the molecular chain; said "a" and "b" denote the numbers of moles for the constitutional units represented in said formulae (1)-3 and (1)-4, respectively, and the formula (1)-5 is satisfied:

$$0.01 < b/a < 1.0 \tag{1)-5.}$$

15. A process for preparing the elastic fiber of polyester elastomer according to claim 14, comprising the steps of;

melt-spinnig said polyester elastomer, drawing the obtained fiber at the draw ratio of 1.5 or more, and then heat-treating at the temperature of 40 degrees Celsius or more;

wherein "Ar" is a p-phenylene group or a 2,6-naphthylene group in said formula (1); "R" is the constitutional unit expressed in said formula (1)-1; "p" is 2; and both "m" and "n" are 0.

16. A process for preparing the elastic fiber of polyester elastomer according to claim 15 wherein the content of poly(alkyleneoxide) glycol component is within the range from 30 to 95 weight percent of the polyester elastomer.

17. A process for preparing the elastic fiber of polyester elastomer according to claim 14, comprising the steps of;

melt-spinning said polyester elastomer, drawing the obtained fiber at the draw ratio of 1.5 or more, and then heat-treating at the temperature of 40 degrees Celsius or more;

wherein "Ar" is a p-phenylene group or a 2,6-naphthylene group in said formula (1); "R" is the constitutional unit expressed in said formulae (1)-3 and (1)-4; "j" in said formula (1)-3 is 0; "$R^6$" in formula (1)-4 is an ethylene group; and said formula (1)-5 is satisfied.

18. A process for preparing the elastic fiber of polyester elastomer according to claim 17, wherein said polyester elastomer satisfies the formula (1)-6;

$$0.05 < a/(a+b+c) < 0.6 \qquad (1)\text{-}6$$

where "c" denotes the number of moles of poly(alkyleneoxide) glycol component; and "a" and "b" are defined the same as those of said formulae (1)-3 and (1)-4.

19. An elastic fiber of polyester elastomer prepared according to the method of claim 14 wherein a residual elongation after 400 percent stretching does not exceed 100 percent.

20. An elastic fiber of polyester elastomer prepared according to the method of claim 14 wherein a residual elongation after 400 percent stretching does not exceed 100 percent, and the strength at break is at least 0.5 g/de.

21. An polyester elastomer suitable for use in preparing an elastic fiber of polyester elastomer, said polyester elastomer comprising a hard segment of an aromatic polyester component mainly comprising repeating units expressed in the formula (1), and a soft segment of a poly(alkyleneoxide) glycol component having a number-average molecular weight of 500 to 5000;
wherein the content of poly(alkyleneoxide)glycol is within the range from 30 to 95 weight percent of the polyester elastomer; and the inherent viscosity of the polyester elastomer (IV) (with measuring solvent of phenol/1,1,2,2-tetrachloroethane=4/6 (in weight percentage) at the measuring temperature of 35 degrees Celsius) is within the range from 0.5 to 13.0;

in said formula (1), "Ar" represents an arylene group having 6 to 20 carbon atoms where part or all of hydrogen in the aromatic ring can be replaced by an alkyl group and/or a halogen atom, and "R" is at least a constitutional unit expressed in the following (A), (A) Formula (1)-1

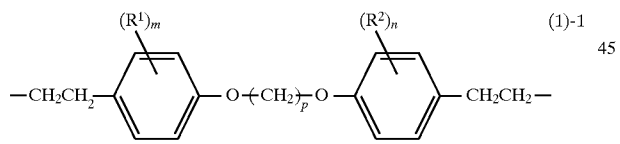

where "p" is an integer of 2 to 4, "R$^1$" and "R$^2$" are independently an alkyl group having 1 to 4 carbon atoms or a halogen atom, "m" and "n" are independently integers of 0 to 4.

22. A polyester elastomer suitable for use in preparing an elastic fiber of polyester elastomer,
said polyester elastomer comprising the hard segment of aromatic polyester component mainly comprising the repeating units expressed in the formula (1), and the soft segment of poly(alkyleneoxide) glycol component having a number-average molecular weight of 500 to 5000;
wherein the content of poly(alkyleneoxide) glycol is within the range from 30 to 95 weight percent of the polyester elastomer; and the inherent viscosity of the polyester elastomer (IV) (with measuring solvent of phenol/1,1,2,2-tetrachloroethane=4/6 (in weight percentage) at the measuring temperature of 35 degrees Celsius) is within the range from 0.5 to 13.0;

in said formula (1), "Ar" represents an arylene group having 6 to 20 carbon atoms where part or whole of hydrogen in the aromatic ring can be replaced by alkyl group and/or halogen atom, and "R" is a constitutional unit expressed in the following (B):

(B) Formula (1)-2

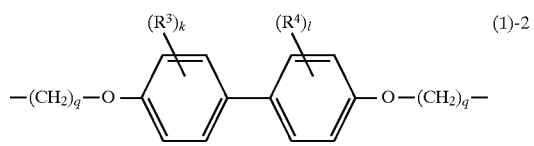

where "q" is an integer of 2 to 4; "R$^3$" and "R$^4$" are independently an alkyl group having 1 to 4 carbon atoms or a halogen atom; "k" and "l" are independently integers of 0 to 4.

23. A polyester elastomer suitable for use in preparing an elastic fiber of a polyester elastomer, said polyester elastomer comprising an aromatic polyester component as a hard segment, and poly(alkyleneoxide)glycol component having a number-average molecular weight of 500 to 5000 as a soft segment; said polyester elastomer mainly comprising the repeating unit expressed in the formula (1);

where "Ar" represents an arylene group having 6 to 20 carbon atoms where part or all of hydrogen in the aromatic ring can be replaced by an alkyl group and/or a halogen atom, and "R" is the constitutional unit expressed in the formula (C):

(C) Formulae (1)-3 and (1)-4

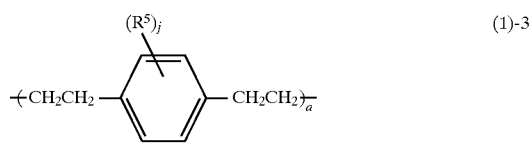

where "R$^5$" is an alkyl group having 1 to 4 carbon atoms or a halogen atom; "j" is an integer of 0 to 4; "R$^6$" is an alkylene group having 2 to 20 carbon atoms which may contain an ether linkage in the molecular chain; said "a" and "b" denote the numbers of moles for the constitutional units represented in said formulae (1)-3 and (1)-4, respectively, and the formula (1)-5 is satisfied:

$$0.01 < b/a < 1.0 \qquad \ldots (1)\text{-}5.$$

* * * * *